United States Patent [19]
Rufo, Jr.

[11] Patent Number: 6,123,192
[45] Date of Patent: Sep. 26, 2000

[54] ROSETTE WITH RELEASE TAB FOR HOLDING DISC SHAPED ELEMENTS

[75] Inventor: George F. Rufo, Jr., Dalton, Mass.

[73] Assignee: Lakewood Industries, Inc., Pittsfield, Mass.

[21] Appl. No.: 09/391,525

[22] Filed: Sep. 8, 1999

[51] Int. Cl.$^7$ .................................................. B65D 85/57
[52] U.S. Cl. ...................... 206/310; 206/308.1; 206/493
[58] Field of Search ................................ 206/309, 308.1, 206/310, 312, 493

[56] References Cited

U.S. PATENT DOCUMENTS

| | | |
|---|---|---|
| 4,793,479 | 12/1988 | Otsuka et al. . |
| 5,251,750 | 10/1993 | Gelardi et al. . |
| 5,526,926 | 6/1996 | Deja . |
| 5,685,427 | 11/1997 | Kuitems et al. . |
| 5,746,314 | 5/1998 | Knutsen et al. ..................... 206/308.1 |
| 5,788,068 | 8/1998 | Fraser et al. . |
| 5,896,986 | 4/1999 | Bolognia et al. . |
| 5,944,181 | 8/1999 | Lau . |
| 5,988,375 | 11/1999 | Chang . |
| 5,996,788 | 12/1999 | Belden, Jr. et al. . |

FOREIGN PATENT DOCUMENTS

WO 96/14636  5/1996  WIPO .

*Primary Examiner*—David T. Fidei
*Attorney, Agent, or Firm*—Nixon Peabody LLP; Stuart J. Friedman, Esq.

[57] ABSTRACT

An improved rosette for securing a disc having a central aperture includes a raised cylindrical hub projecting upward from a planar base, the hub being formed of first and second upstanding annular sections having substantially cylindrical side walls1, the first annular section comprising at least 180° of the circumferential extent of the circular hub. Each of the annular sections includes at least one radially extending rim projecting outwardly beyond the cylindrical side walls. The second annular section cylindrical wall is positioned radially outwardly of the cylindrical wall of the first annular section and is supported on the base for allowing radially inward and downward pivoting of its cylindrical wall. An arm cantilevered from the cylindrical wall of the second annular section above the base extends radially inwardly toward the central axis of the hub such that downward finger pressure applied to the free end of the arm causes the cylindrical wall of the second annular section to pivot radially inwardly and downwardly to allow the central aperture of a disc mounted on the rosette to be released from engagement with the radially extending rims for one-handed removal of the disc from the rosette. Optionally, the rosette may include resilient ejection means to support a disc above the base when the disc is mounted on the rosette and to urge the disc off of the rosette when the disc is released from engagement with the radially extending rims.

38 Claims, 4 Drawing Sheets

ROSETTE WITH RELEASE TAB FOR HOLDING DISC SHAPED ELEMENTS

BACKGROUND OF THE INVENTION

1. Field of the Invention

The present invention relates generally to enclosures for receiving and storing digitally coded discs and, more particularly, to an improved disc retaining means for holding such discs within such enclosures.

2. Description of the Prior Art

Various types of planar discs are in use at the present time to record and store information which is to be retrieved by various means, such as by optical or magnetic means. Typical of such discs are compact discs (CDs) in which information is digitally recorded by use of a laser beam and then read optically by a laser beam. Such discs are used to record audio information, such as musical renditions, video information such as visual images and digital information for use as read only and other memories for use in various applications, such as computer applications. In most instances, at the present time, such discs are sold with information already recorded thereon. In other applications, such discs are sold in blank form and are used by the customer to record information thereon. In the latter case, for example, optical discs are sold for use as computer storage media and are used in hard disc storage systems. In either case, optical imperfections in or on the surfaces of such discs interfere with both the recording and retrieval of information stored on the discs. Care must, therefore, be taken in the storage, moving and handling of such discs to avoid causing any such imperfections. As used herein, the term compact disc or CD is intended to encompass all such discs, whatever their size, for all known or proposed uses.

Compact discs containing laser recorded information are typically packaged in enclosures designed to hold one or more CDs for protecting the discs during storage and shipment. Enclosures commonly used at the present time comprise a three piece assembly consisting of a base or bottom element, an insert or tray in the base/bottom element for positioning and supporting the disc in the base/bottom element, e.g., by a center projection (commonly referred to as a "rosette") which engages the periphery of the aperture in the center of the disc, and a lid or cover which is hinged to the base/bottom element and is closed thereon after the disc is mounted therein on the tray. Other enclosures utilize only two pieces, omit the tray, and position and support the disc via the center projection directly on the base/bottom element. The enclosure is, typically, at least partially transparent and graphics relating to the disc and containing trademark and sales promotional information are usually inserted in such a manner as to be visible through the enclosure.

It has become conventional for the elements of the CD enclosures to be formed by injection molding. As a consequence the rosettes are formed of the same plastic material as the base or tray with which they are integrally molded. The base and/or tray elements and, therefore, the rosettes have typically been made from pigmented thermoplastic molding resins having sufficient impact resistance to withstand the forces attendant to mounting and unmounting CDs as well as the forces experienced during shipping and handling.

Most typically, the rosette comprises a raised hub which is formed integrally with the base/bottom element or tray, preferably by injection molding. The hub includes a plurality of small gripping teeth or fingers for radially engaging the central aperture in the CD. Generally, to mount a CD onto the rosette, the central aperture of the CD is positioned over the rosette and a slight downward pressure is applied. Due to the relative dimensions of the central aperture and the rosette, the downward pressure causes the gripping teeth or fingers to deflect radially inwardly and to resiliently engage the central aperture of the CD. In this way the rosette engages and secures the CD in place during storage. To remove a CD from the rosette, the top center of the rosette is pressed down with one finger to disengage the teeth or fingers while the periphery of the CD is simultaneously lifted. One of the problems with many currently available enclosures is that, because it is difficult to continuously push on the top center of the rosette while lifting, frequently, release pressure on the top of the rosette is not maintained while lifting pressure on the periphery is increased. The result is that the disc is forced off of the rosette, causing the CD to bent or broken and the rosette to be damaged.

There have been many attempts to make disc removal easier and less damaging. For example, U.S. Pat. No. 4,793,479—Otsuka et al discloses dis-engagement structure in which the rosette is provided with a central pushing part having cranked flap pieces arranged such that pressing down on the pushing part causes the cranked flap pieces to push the disc off the disc-engagement structure. U.S. Pat. No. 5,251,750—Gelardi et al teaches a rosette having upwardly extending engagement arms for engaging the center hole of a disc at their upper ends and which extend radially inwardly for connection with a center button, the engagement arms having integrally molded upwardly extending ejection arms at their lower end for engaging the underside of the disc. When the center button is depressed the upwardly extending ejection arms push upwardly on the underside of the disc to release its engagement with the upper end of the engagement arms. U.S. Pat. No. 5,788,068—Fraser et al discloses a central disk retaining member comprising two resilient inwardly extending radial arms cantilevered from the base portion and interconnected at their inner ends to provide a central button-like member, the arms being formed with disk-retaining overhanging lips to retain the disk on the member. To release a disk from engagement with the member, the central button is depressed, causing the arms to rotate downwardly and inwardly, to allow the disk to be lifted over the overhanging lips.

However, efforts to date directed at solving the disc removal problem suffer from one or more shortcomings which make the resulting rosette either unsatisfactory or not particularly desirable for use in a CD enclosure. This is because prior art rosettes are, typically, either of complex construction and, therefore, uneconomical to manufacture or unacceptably fragile and unreliable in use, which presents substantial risk of damaging the information bearing surface of the disc. Accordingly, there remains a need for a simple, inexpensive to manufacture and easy to use rosette for a CD enclosure which is configured to facilitate safe mounting and unmounting of the disc thereon and which does not present a damage risk for the disc's information bearing surface.

SUMMARY OF THE INVENTION

It is therefore a primary object of the present invention to provide a rosette for a CD enclosure which permits its manufacture by injection molding, which is configured to facilitate safe mounting and unmounting of the disc thereon and which does not present a damage risk for the disc's information bearing surface.

It is also an object of the present invention to provide an improved rosette for a CD enclosure which is simple, inexpensive to manufacture and easy to use.

It is another object of the present invention to provide a rosette for a CD enclosure which securely holds a CD in place thereon but which enables easy one-handed removal of the CD therefrom.

It is still another object of the present invention to provide a rosette for a CD enclosure formed in two partially cylindrical sections which together define a generally cylindrical upstanding rosette, one of the sections being resiliently mounted on the base to permit inward pivotal movement of its cylindrical wall along a radially directed arc in response to downward finger pressure on a radially inwardly extending tab cantilevered from the cylindrical wall, whereby a disc mounted on the rosette may be one-handedly removed therefrom.

It is yet another object of the present invention to provide a rosette which includes resilient ejection means arranged to support a disc above the base when the disc is mounted on the rosette and to urge the disc off of the rosette when the disc is released from engagement therewith.

The foregoing and other objects are achieved in accordance with the present invention by providing disc retaining means for securing at least one disc shaped element having a central aperture, the disc retaining means comprising: a) a raised circular hub having a substantially cylindrical side wall, the hub projecting upward from a planar base and having a central axis extending generally parallel to the cylindrical side wall; b) the hub comprising first and second upstanding annular sections having, respectively, first and second substantially cylindrical side walls which together define the substantially cylindrical hub side wall, the first annular section comprising at least 180° of the circumferential extent of the circular hub and the second annular section comprising substantially the remainder of the 360° circumferential extent of the hub; c) each of the annular sections including at least one radially extending rim projecting outwardly beyond the outside diameter of the annular section cylindrical side walls; d) the second annular section being radially offset away from the central axis such that the cylindrical wall of the second annular section is positioned radially outwardly of the cylindrical wall of the first annular section; e) means for supporting the second annular section on the base to allow the cylindrical wall of the second annular section to pivot radially inwardly and downwardly and to resiliently return to its unpivoted position; f) tab means cantilevered from the second annular section above the base, the tab means extending radially inwardly toward the central axis; g) wherein a disc shaped element mounted on the disc retaining member may be one-handedly removed therefrom by the application of finger pressure to the tab means in a direction causing the free end of the tab means to move downwardly toward the base, the movement of the tab means causing the cylindrical wall of the second annular section to pivot radially inwardly and downwardly, allowing the disc central aperture to slide upwardly over the radially extending rims, whereby the disc shaped element raises up off of the hub as it is released from engagement with the radially extending rims.

Desirably, the disc retaining means further includes resilient ejection means arranged to support the disc shaped element above the base when the element is mounted on the disc retaining member and to urge the disc shaped element off of the disc retaining member when the element is released from its engagement with the radially extending rims. Preferably, the resilient ejection means comprises a plurality of resilient arms cantilevered from the base and extending into contact with the underside of the disc shaped element when the element is mounted on the disc retaining member.

DESCRIPTION OF THE PREFERRED EMBODIMENT

A preferred embodiment of the present invention is illustrated in FIGS. 1, 2, 3 and 4 in which there is illustrated an improved rosette or mounting hub 10 for a CD enclosure. Rosette 10 is generally positioned in the same location within CD enclosures as prior art rosettes, i.e., generally centrally located on the insert or tray of three piece enclosures or on the base of two piece enclosures. Desirably, rosette 10 is molded integrally with the base or tray of the enclosure. In the embodiment of FIGS. 1–4, rosette 10 is molded on raised CD seat 12 which, itself, is molded on tray or base 14. Raised seat 12 provides a circular surface on which the annular area of the CD which is immediately adjacent the central disc aperture can be supported above the base 14. This area of the CD typically contains no recorded information and, therefore, contact between the CD in this area and the raised seat will not damage the CD. The CD may optionally be peripherally supported at its outer edges (not shown) which also, typically, contains no recorded information in order to provide further assurance that contact of the recorded areas of the CD with either the base or tray or the cover of the CD enclosure will be avoided. Extending upward from disc seat 12 is rosette 10 which is essentially a vertical cylindrical section comprising first and second upstanding annular sections 16, 18, respectively, which together define the generally cylindrical rosette 10.

First annular section 16, substantially rigidly supported from base 14, includes at least one, preferably two or more (three are shown), circumferentially spaced, radially outwardly projecting rim sections 20 along its upper edge. First annular section 16 comprises more than 180° of the circumferential extent of the cylindrical rosette. Preferably, the circumferential extent of the first annular section 16 is from 270° to 315°, although it will be appreciated that the selected extent will vary depending upon such factors as size of the rosette, material from which the rosette is molded, and the like. Second annular section 18, which is also supported from base 14, albeit less rigidly than section 16, comprises the remainder of the approximately 360° circumferential extent of the rosette cylinder. Second annular section 18 is radially offset away from the axis 26 of the cylindrical rosette so that section 18 extends radially outwardly of the first annular section 16. Like section 16, second annular section 18 includes at least one, preferably two or more (two are shown), circumferentially spaced, radially outwardly projecting rim sections 28 along its upper edge. A plurality of apertures 24 are formed in raised seat 12 underlying the respective rim sections 20, 28 to allow the rim sections to be formed during a one-shot molding operation.

Figure 1:
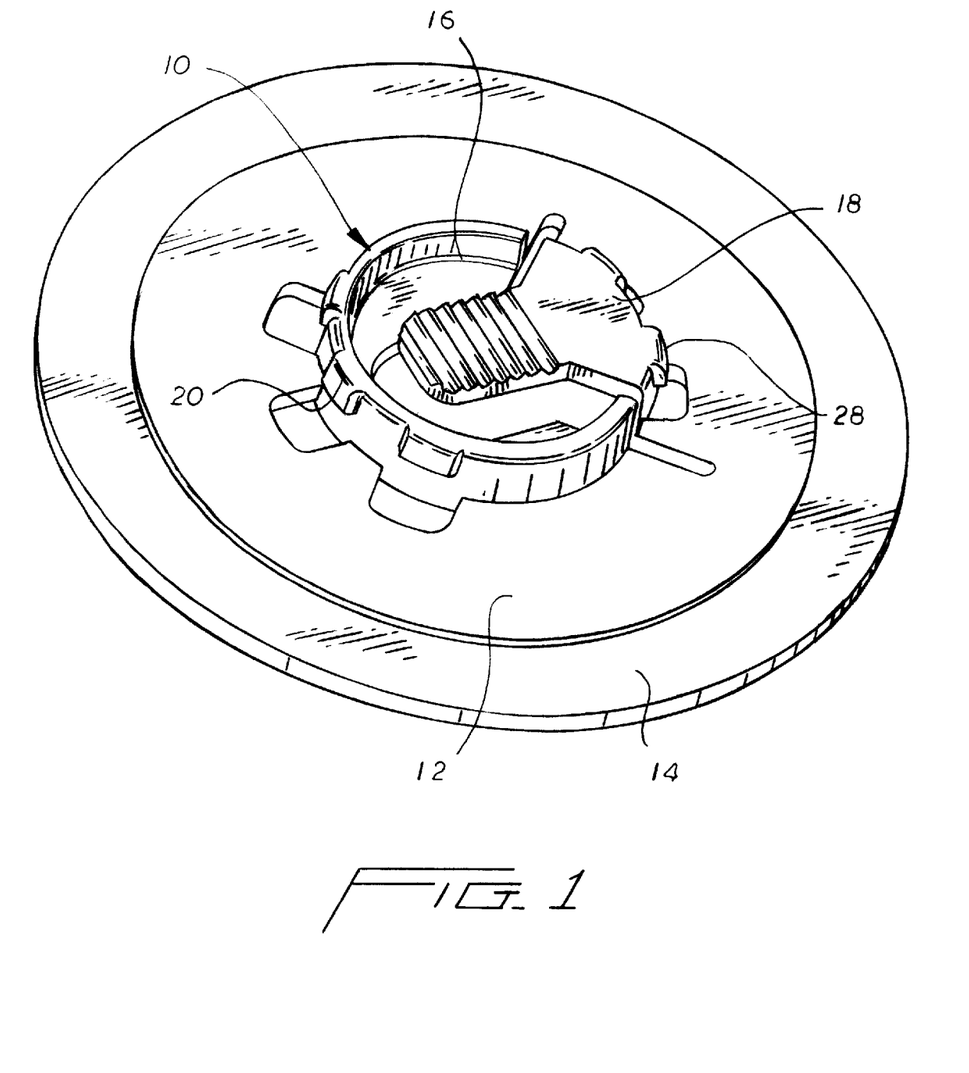
FIG. 1 is a perspective view of one embodiment of the improved rosette of the present invention.
Figure 2:
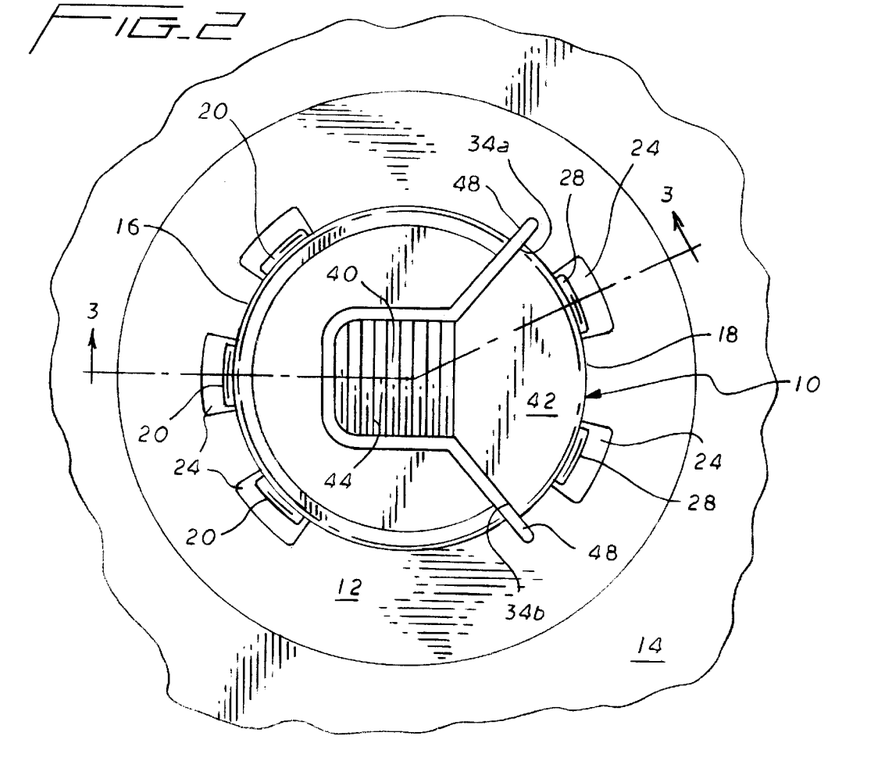
FIG. 2 is a plan view of the improved rosette of FIG. 1.
Figure 3:
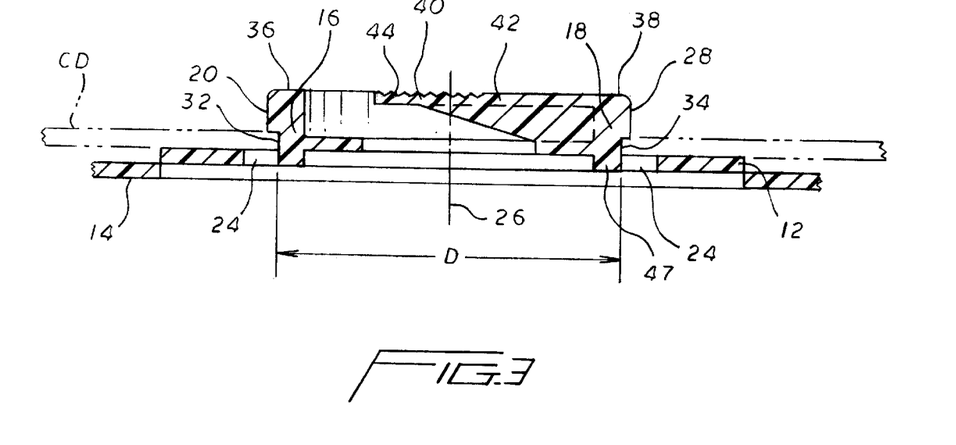
FIG. 3 is a sectional view taken along line 3—3 of FIG. 2.

Each annular section 16, 18 includes at least one rim section 20, 28 which projects radially outwardly beyond the outer diameter of the outer vertical cylindrical walls 32, 34 of each section 16, 18 of rosette 10 and extends circumferentially along walls 32, 34. As can be seen in FIGS. 1 and 2, each of the rim sections desirably extends circumferentially only a short distance along vertical walls 32, 34 although they may extend a greater distance, up to the entire circumferential length of each annular section 16, 18, if desired. With reference to FIG. 3 it will be seen that rim sections 20, 28 extends outwardly and downwardly from the merge point between annular section vertical walls 32, 34 and annular section top walls 36, 38 and continue downwardly along vertical walls 32, 34 to a point intermediate the length of walls 32, 34 where the rim sections 20, 28 extend inwardly to merge with the vertical walls. The radially outer edges of top walls 36, 38 are chamfered or rounded to provide a guide curvature which allows the CD to slip easily over rosette 10.

The outer diameter D of rosette 10 measured between vertical walls 32, 34 is slightly larger than the diameter of the disc central aperture. Rim sections 20, 28 extend radially outwardly from the vertical walls 32, 34 which makes the outer diameter at the rim sections even larger than the outer diameter of the rosette 10 at the vertical walls 32, 34. In order to mount a disc, the disc central aperture is centered over rosette 10 and the CD is pressed vertically downward such that the perimetric edge of the CD central aperture contacts the chamfered or rounded upper edges of the annular sections 16, 18 causing the smaller and more resiliently mounted second annular section 18 to tilt inwardly along a radially inwardly directed arc about a fulcrum 47 defined by the area of joinder between the lower end of cylindrical wall 34 and raised seat 12. A pair of slits 48 formed in raised seat 12 and extending generally radially outwardly from adjacent the ends 34a, 34b of cylindrical wall 34 of second annular section 18 allows section 18 the freedom to pivot generally about its fulcrum 47 and to tilt inwardly and downwardly, as described. As a result, upon tilting of cylindrical wall 34, the effective maximum diameter of the rosette temporarily decreases to accommodate the somewhat smaller diameter of the disc central aperture. After the disc central aperture has passed over the rim sections 20, 28 on the annular sections 16, 18, the second annular section 18 resiliently returns toward its rest position. When the disc aperture has completely passed over rim sections 20, 28, the vertical walls 32, 34 of rosette 10 engage the perimetric edge of the disc central aperture to securely hold the disc in position. At this point, because the outer diameter defined by the vertical walls 32, 34 in their rest position is slightly larger than the diameter of the disc central aperture, the second annular section 18 cannot completely return to its rest position and the vertical walls 32, 34 are, therefore, resiliently biased against and applying a light, secure, outwardly directed pressure against the perimetric edge of the disc central aperture. When the disc (CD) is fully seated on raised seat 12, as shown in phantom in FIG. 3, it is securely held in place on rosette 10 by the radially outward directed pressure of the vertical walls 32, 34 and by the pressure of the underside of rim sections 20, 28 along the upper surface of the disc adjacent the perimetric edge of the disc central aperture.

Figure 4:
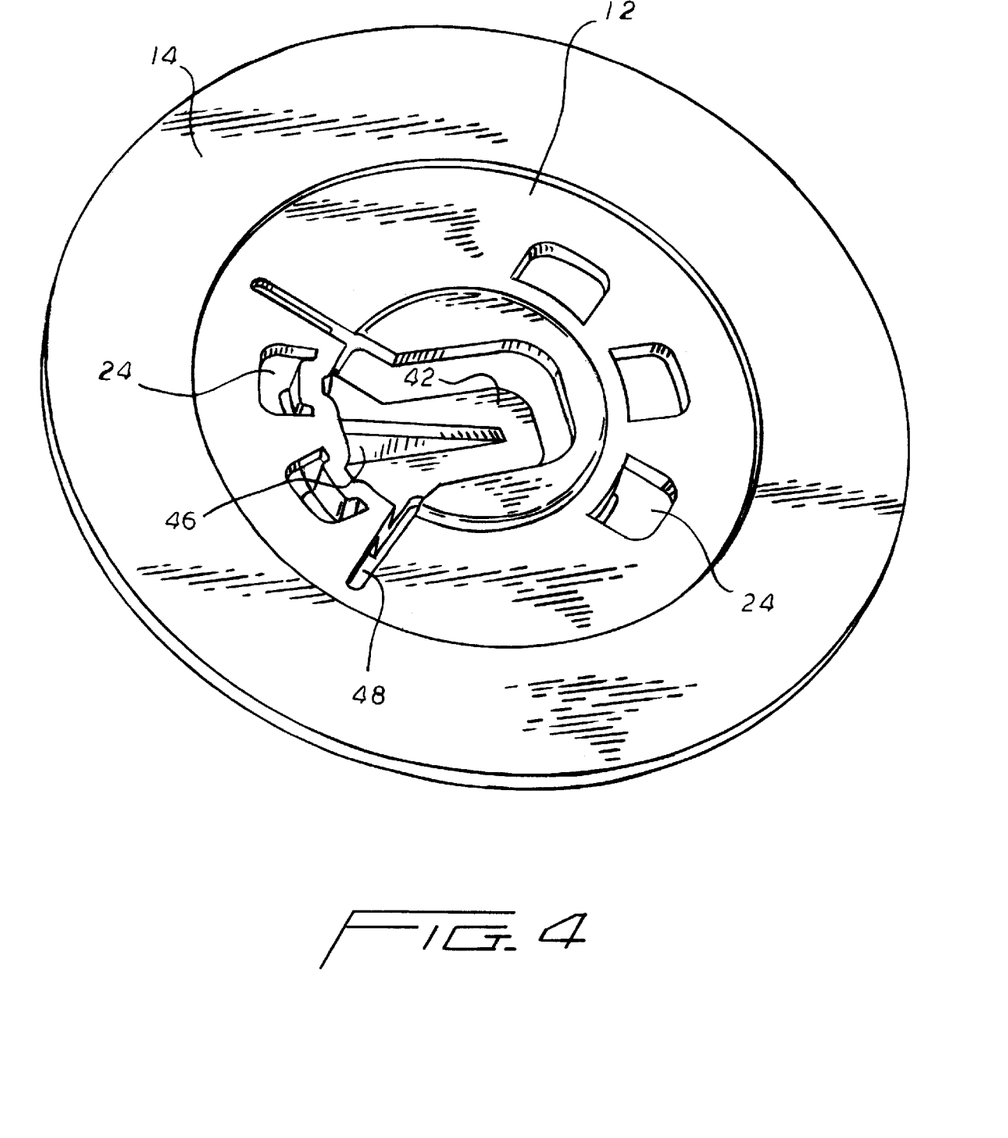
FIG. 4 is a perspective view of the underside of the improved rosette of FIG. 1.

A radially inwardly extending arm cantilevered from the cylindrical wall 34 of the second annular section 18 defines a disc release tab 42 which is operatively associated with second annular section 18 and adapted to be vertically depressed to quickly and easily release a mounted disc from its engagement on rosette 10. Removal of a disc from rosette 10 is accomplished simply by using a finger to exert a light downward pressure on the free end 40 of tab 42. Upon depressing free end 40, second annular section 18 tilts inwardly towards the axis 26 of rosette 10 and downwardly, causing rim sections 28 on the second annular section 18 to likewise move inwardly and downwardly. As a result, the effective diameter of the rosette again temporarily decreases to accommodate the somewhat smaller diameter of the disc central aperture causing the disc to slide upwardly over and past rim sections 20, 28. The free end 40 of tab 42 preferably defines, via a series of ridges 44, a pressure applying area for depressing the tab. Desirably, tab 42 has a sufficient radial length that the ridged pressure applying area thereof is centered upon or extends radially inwardly beyond the axis 26 of rosette 10. In a particularly preferred embodiment, tab 42 is supported along the entire circumferential length of second annular section 18 to allow vertically downwardly directed pressure on the free end 40 thereof to be readily translated into inwardly and downwardly directed tilting movement of second annular section 18. With reference to FIG. 4, in one embodiment of the invention, a molded rib 46 is formed on the underside of tab 42 to reinforce the tab without inhibiting the flexibility and freedom of movement of the free end 40 of tab 42.

Figure 5:
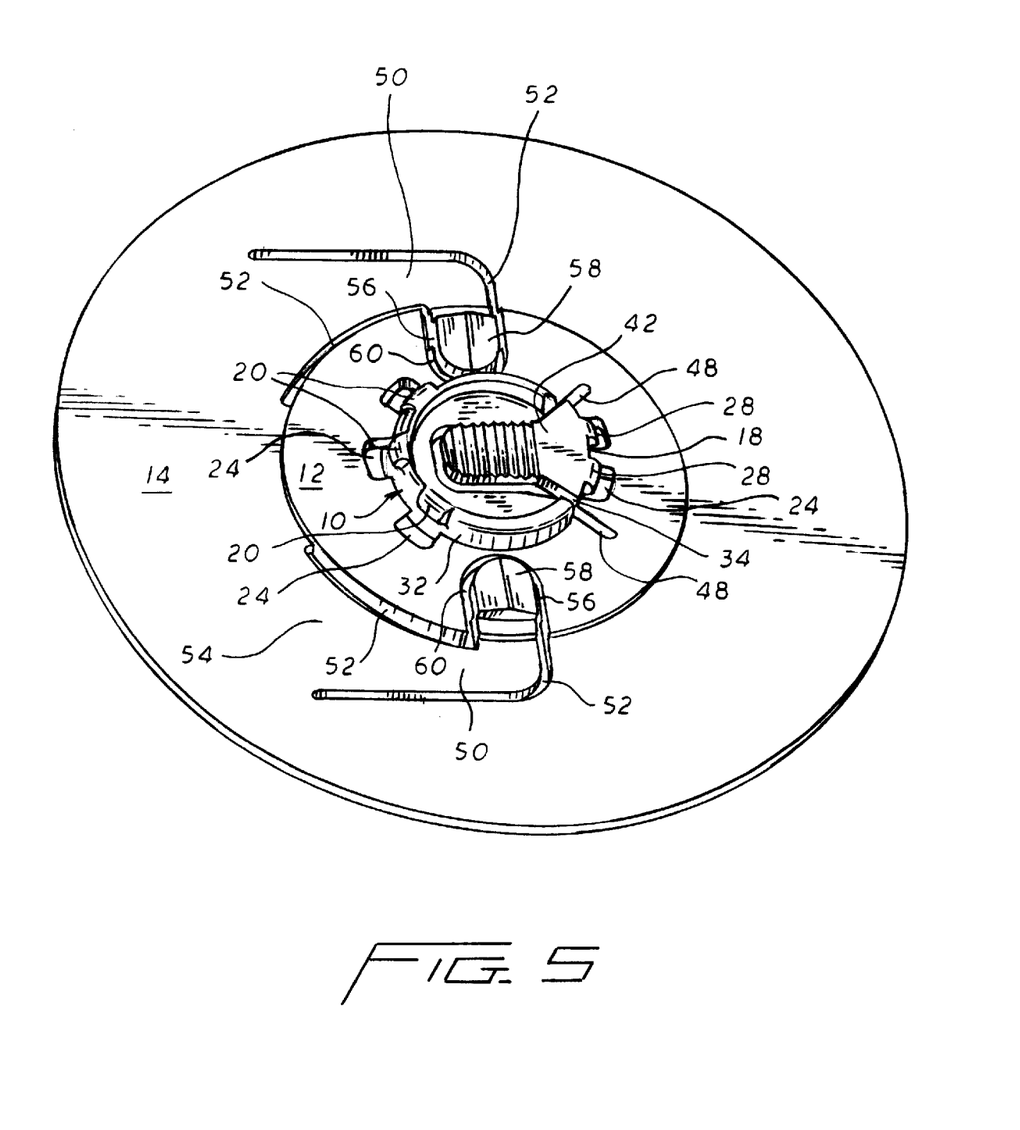
FIG. 5 is a plan view of another embodiment of the improved rosette of the present invention.

In a further embodiment of the invention, illustrated in FIG. 5, molded integrally with the rosette 10 are at least two, but permissibly more than two, consistent with the space available and the structural integrity of the base 12, resilient inwardly extending disc ejection arms 50 cantilevered from the base 14 which act to move the disk upwardly, away from base 14, when the engagement of the disk with rosette 10 is released. Disk ejection arms 50 are formed from raised seat 12 and base 14 by continuous slits 52 therein which define generally L-shaped disk ejection arms. Each disk ejection arm 50 is formed integrally with base 14 at one end 54 and is free at the other end 56. The free end has a disc contacting member 58 projecting upwardly therefrom and extending through a cut-out 60 in raised seat 12 above the height thereof such that a disc mounted upon rosette 10 contacts members 58 and resiliently depresses disc ejection arms 50 as it is pressed downwardly over rim sections 20, 28. When the disc is fully seated with the upper surface thereof in contact with the underside of the rim sections 20, 28, the disc is fully supported by the disc ejection arms 50 above raised seat 12 and disc ejection arms 50 remain resiliently depressed beneath the disc, applying a slight upward pressure to the underside thereof. In this position, the disc is, in effect, floating on the disc ejection arms and is protected from sudden shock loads during handling or transit. Upon depressing tab 42 to release the disk from its engagement with rosette 10, after second annular section 18 tilts inwardly toward the axis 26 of rosette 10 to temporarily reduce the effective diameter of rosette 10 below the diameter of the disc central aperture, the slight upward pressure exerted by disk ejection arms 50 on the underside of the disc pushes the disc upwardly off of rosette 10 as the disc is freed from the constraints of the projecting rim sections 20, 28.

The present invention is directed not only to the improved rosettes described herein but also to an improved insert or tray for securing and storing one or more CDs, which insert or tray is particularly useful as an element of three piece CD enclosures. Typically, such an insert or tray comprises a substantially planar surface from which the improved rosette of the present invention projects upwardly. Desirably, the insert or tray includes a raised circular seat from which the rosette projects and on which the annular area of the CD which is immediately adjacent the central disc aperture can be supported. This area of the CD typically contains no recorded information and, therefore, contact between the CD in this area and the raised seat will not damage the CD. The insert or tray may also include a supporting raised surface for peripherally supporting the CD along its outer edges which also, typically, contain no recorded information and which will not be damaged by contact with the tray. Typically, the rosette of the present invention is positioned in the center of the insert or tray. However, if the insert or tray is substantially larger than the CD, is shaped to store other CDs or items other than CDs, or for other reasons, the rosette need not be positioned in the center of the insert or tray. CD three piece enclosures generally also include a base or bottom element in which the insert or tray may be removably secured and a lid or cover element which is hinged to the base or bottom element and is closed thereon after the disc is mounted therein on the rosette. Where the CD enclosure is of the two piece variety, the tray or insert generally comprises the base or bottom element of the enclosure to which the lid or cover is hinged.

While the present invention has been described in terms of specific embodiments thereof, it will be understood that no limitations are intended to the details of construction or design other than as defined in the appended claims.

What is claimed is:

1. A disc retaining member for securing a disc shaped element having a central aperture, said member comprising:
   a) a raised circular hub having a substantially cylindrical side wall, said hub projecting upward from a planar base and having a central axis extending generally parallel to said cylindrical side wall;
   b) said hub comprising first and second upstanding annular sections having, respectively, first and second substantially cylindrical side walls which together define the substantially cylindrical hub side wall, said first annular section comprising at least 180° of the circumferential extent of said circular hub and said second annular section comprising substantially the remainder of the 360° circumferential extent of said hub;
   c) each of said annular sections including at least one radially extending rim projecting outwardly beyond the outside diameter of said annular section cylindrical side walls;
   d) said second annular section being radially offset away from said central axis such that the cylindrical wall of said second annular section is positioned radially outwardly of the cylindrical wall of said first annular section;
   e) means for supporting said second annular section on said base to allow the cylindrical wall of said second annular section to pivot radially inwardly and downwardly and to resiliently return to its unpivoted position;
   f) tab means cantilevered from said second annular section above said base, said tab means extending radially inwardly toward said central axis;
   g) wherein a disc shaped element mounted on said disc retaining member may be one-handedly removed therefrom by the application of finger pressure to said tab means in a direction causing the free end of said tab means to move downwardly toward said base, the movement of said tab means causing said cylindrical wall of said second annular section to pivot radially inwardly and downwardly, allowing the disc central aperture to slide upwardly over said radially extending rims, whereby the disc shaped element raises up off of said hub as it is released from engagement with said radially extending rims.

2. A disc retaining member, as claimed in claim 1, wherein said first annular section includes three circumferentially spaced apart rims projecting therefrom.

3. A disc retaining member, as claimed in claim 1, wherein said second annular section includes two circumferentially spaced apart rims projecting therefrom.

4. A disc retaining member, as claimed in claim 1, 2 or 3, wherein each of said rims extends downwardly along the respective annular section cylindrical side wall for a distance less than the height of said wall for permitting a disk shaped element mounted on said disc retaining member to be supported from said base with the underside of said rims in contact with the upper surface of said disc shaped element.

5. A disc retaining member, as claimed in claim 1, wherein said first annular section comprises from 180° to 315° of the circumferential extent of said circular hub.

6. A disc retaining member, as claimed in claim 1, including at least two elongate slits formed in said base adjacent the cylindrical side wall of said second annular section and extending generally radially outwardly therefrom for allowing pivotal movement of said cylindrical side wall.

7. A disc retaining member, as claimed in claim 6, wherein two elongate slits are formed in said base, said slits extending generally radially outwardly from the ends of the cylindrical wall of said second annular section adjacent the ends thereof.

8. A disc retaining member, as claimed in claim 1, wherein said tab means comprises a radially inwardly extending elongate arm cantilevered from the cylindrical side wall of said second annular section, said arm including a pressure applying area adjacent the free end thereof.

9. A disc retaining member, as claimed in claim 8, wherein said arm has at least sufficient radial length that the pressure applying area is at least centered upon said central axis.

10. A disc retaining member, as claimed in claim 8, wherein said pressure applying area is textured on the upper surface of said arm.

11. A disc retaining member, as claimed in claim 8, wherein said arm is supported along the circumferential length of said second annular section.

12. A disc retaining member, as claimed in claim 8, further including an integrally formed rib on the underside of said arm.

13. A disc retaining member, as claimed in claim 12, wherein said rib extends from said second annular section cylindrical side wall radially inwardly along the underside of said arm for a distance less than the length of said arm.

14. A disc retaining member, as claimed in claim 1, further including resilient ejection means arranged to support said disc shaped element above said base when said element is mounted on said disc retaining member and to urge said disc shaped element off of said disc retaining member when said element is released from its engagement with said radially extending rims.

15. A disc retaining member, as claimed in claim 14, wherein said resilient ejection means comprises a plurality of resilient arms cantilevered from said base and extending into contact with the underside of said disc shaped element when said element is mounted on said disc retaining member.

16. A disc retaining member, as claimed in claim 15, wherein said plurality of resilient arms comprises at least two such arms.

17. A disc retaining member, as claimed in claim 16, wherein said at least two arms are equally circumferentially spaced apart on said base.

18. A disc retaining member for securing a disc shaped element having a central aperture, said member comprising:
   a) a raised circular hub having a substantially cylindrical side wall, said hub projecting upward from a planar base and having a central axis extending generally parallel to said cylindrical side wall;

b) said hub comprising first and second upstanding annular sections having, respectively, first and second substantially cylindrical side walls which together define the substantially cylindrical hub side wall, said first annular section comprising at least 180° of the circumferential extent of said circular hub and said second annular section comprising substantially the remainder of the 360° circumferential extent of said hub;

c) each of said annular sections including at least two circumferentially spaced apart radially extending rims projecting outwardly beyond the outside diameter of said annular section cylindrical side walls;

d) said second annular section being radially offset away from said central axis such that the cylindrical wall of said second annular section is positioned radially outwardly of the cylindrical wall of said first annular section;

e) means for supporting said second annular section on said base to allow the cylindrical wall of said second annular section to pivot radially inwardly and downwardly and to resiliently return to its unpivoted position, said means for supporting including at least two elongate slits formed in said base adjacent the cylindrical side wall of said second annular section and extending generally radially outwardly from adjacent the ends thereof for allowing pivotal movement of said cylindrical side wall;

f) an elongate arm cantilevered from the cylindrical side wall of said second annular section above said base, said arm extending radially inwardly toward said axis and including a pressure applying area adjacent the free end thereof, said arm having at least sufficient radial length that the pressure applying area is at least centered upon said central axis of said hub;

g) wherein a disc shaped element mounted on said disc retaining member may be one-handedly removed therefrom by the application of finger pressure to said pressure applying area in a direction causing the free end of said arm to move downwardly toward said base, the movement of said arm causing said cylindrical wall of said second annular section to pivot radially inwardly and downwardly, allowing the disc central aperture to slide upwardly over said radially extending rims, whereby the disc shaped element raises up off of said hub as it is released from engagement with said radially extending rims.

19. A disc retaining means, as claimed in claim 18, further including resilient ejection means arranged to support said disc shaped element above said base when said element is mounted on said disc retaining member and to urge said disc shaped element off of said disc retaining member when said element is released from its engagement with said radially extending rims, said resilient ejection means comprising a plurality of resilient arms cantilevered from said base and extending into contact with the underside of said disc shaped element when said element is mounted on said disc retaining member.

20. A storage tray for storing and securing a disc shaped element having a central aperture, said tray comprising a substantially planar base having a disc retaining member integral therewith, said member comprising:

a) a raised circular hub having a substantially cylindrical side wall, said hub projecting upward fro m said planar base and having a central axis extending generally parallel to said cylindrical side wall;

b) said hub comprising first and second upstanding annular sections having, respectively, first and second substantially cylindrical side walls which together define the substantially cylindrical hub side wall, said first annular section comprising at least 180° of the circumferential extent of said circular hub and said second annular section comprising substantially the remainder of the 360° circumferential extent of said hub;

c) each of said annular sections including at least one radially extending rim projecting outwardly beyond the outside diameter of said annular section cylindrical side walls;

d) said second annular section being radially offset away from said central axis such that the cylindrical wall of said second annular section is positioned radially outwardly of the cylindrical wall of said first annular section;

e) means for supporting said second annular section on said base to allow the cylindrical wall of said second annular section to pivot radially inwardly and downwardly and to resiliently return to its unpivoted position;

f) tab means cantilevered from said second annular section above said base, said tab means extending radially inwardly toward said axis;

g) wherein a disc shaped element mounted on said disc retaining member may be one-handedly removed therefrom by the application of finger pressure to said tab means in a direction causing the free end of said tab means to move downwardly toward said base, the movement of said tab means causing said cylindrical wall of said second annular section to pivot radially inwardly and downwardly, allowing the disc central aperture to slide upwardly over said radially extending rims, whereby the disc shaped element raises up off of said hub as it is released from engagement with said radially extending rims.

21. A disc retaining member, as claimed in claim 20, wherein said first annular section includes three circumferentially spaced apart rims projecting therefrom.

22. A disc retaining member, as claimed in claim 20, wherein said second annular section includes two circumferentially spaced apart rims projecting therefrom.

23. A disc retaining member, as claimed in claim 20, 21 or 22, wherein each of said rims extends downwardly along the respective annular section cylindrical side wall for a distance less than the height of said wall for permitting a disk shaped element mounted on said disc retaining member to be supported from said base with the underside of said rims in contact with the upper surface of said disc shaped element.

24. A disc retaining member, as claimed in claim 20, wherein said first annular section comprises from 180° to 315° of the circumferential extent of said circular hub.

25. A disc retaining member, as claimed in claim 20, including at least two elongate slits formed in said base adjacent the cylindrical side wall of said second annular section and extending generally radially outwardly therefrom for allowing pivotal movement of said cylindrical side wall.

26. A disc retaining member, as claimed in claim 25, wherein two elongate slits are formed in said base, said slits extending generally radially outwardly from the ends of the cylindrical wall of said second annular section adjacent the ends thereof.

27. A disc retaining member, as claimed in claim 20, wherein said tab means comprises a radially inwardly extending elongate arm cantilevered from the cylindrical side wall of said second annular section, said arm including a pressure applying area adjacent the free end thereof.

28. A disc retaining member, as claimed in claim 27, wherein said arm has at least sufficient radial length that the pressure applying area is at least centered upon said central axis.

29. A disc retaining member, as claimed in claim 27, wherein said pressure applying area is textured on the upper surface of said arm.

30. A disc retaining member, as claimed in claim 27, wherein said arm is supported along the circumferential length of said second annular section.

31. A disc retaining member, as claimed in claim 27, further including an integrally formed rib on the underside of said arm.

32. A disc retaining member, as claimed in claim 31, wherein said rib extends from said second annular section cylindrical side wall radially inwardly along the underside of said arm for a distance less than the length of said arm.

33. A disc retaining member, as claimed in claim 20, further including resilient ejection means arranged to support said disc shaped element above said base when said element is mounted on said disc retaining member and to urge said disc shaped element off of said disc retaining member when said element is released from its engagement with said radially extending rims.

34. A disc retaining member, as claimed in claim 33, wherein said resilient ejection means comprises a plurality of resilient arms cantilevered from said base and extending into contact with the underside of said disc shaped element when said element is mounted on said disc retaining member.

35. A disc retaining member, as claimed in claim 34, wherein said plurality of resilient arms comprises at least two such arms.

36. A disc retaining member, as claimed in claim 35, wherein said at least two arms are equally circumferentially spaced apart on said base.

37. A disc retaining member for securing a disc shaped element having a central aperture, said member comprising:
   a) a raised circular hub having a substantially cylindrical side wall, said hub projecting upward from a planar base and having a central axis extending generally parallel to said cylindrical side wall;
   b) said hub comprising first and second upstanding annular sections having, respectively, first and second substantially cylindrical side walls which together define the substantially cylindrical hub side wall, said first annular section comprising at least 180° of the circumferential extent of said circular hub and said second annular section comprising substantially the remainder of the 360° circumferential extent of said hub;
   c) each of said annular sections including at least two circumferentially spaced apart radially extending rims projecting outwardly beyond the outside diameter of said annular section cylindrical side walls;
   d) said second annular section being radially offset away from said central axis such that the cylindrical wall of said second annular section is positioned radially outwardly of the cylindrical wall of said first annular section;
   e) means for supporting said second annular section on said base to allow the cylindrical wall of said second annular section to pivot radially inwardly and downwardly and to resiliently return to its unpivoted position, said means for supporting including at least two elongate slits formed in said base adjacent the cylindrical side wall of said second annular section and extending generally radially outwardly from adjacent the ends thereof for allowing pivotal movement of said cylindrical side wall;
   f) an elongate arm cantilevered from the cylindrical side wall of said second annular section above said base, said arm extending radially inwardly toward said axis and including a pressure applying area adjacent the free end thereof, said arm having at least sufficient radial length that the pressure applying area is at least centered upon said central axis of said hub;
   g) wherein a disc shaped element mounted on said disc retaining member may be one-handedly removed therefrom by the application of finger pressure to said pressure applying area in a direction causing the free end of said arm to move downwardly toward said base, the movement of said arm causing said cylindrical wall of said second annular section to pivot radially inwardly and downwardly, allowing the disc central aperture to slide upwardly over said radially extending rims, whereby the disc shaped element raises up off of said hub as it is released from engagement with said radially extending rims.

38. A disc retaining means, as claimed in claim 37, further including resilient ejection means arranged to support said disc shaped element above said base when said element is mounted on said disc retaining member and to urge said disc shaped element off of said disc retaining member when said element is released from its engagement with said radially extending rims, said resilient ejection means comprising a plurality of resilient arms cantilevered from said base and extending into contact with the underside of said disc shaped element when said element is mounted on said disc retaining member.

* * * * *